United States Patent
Senatore et al.

(10) Patent No.: US 6,728,461 B1
(45) Date of Patent: Apr. 27, 2004

(54) OPTICAL FIBER CABLE MANAGER

(76) Inventors: Marc Senatore, 428 Colon Ave., Staten Island, NY (US) 10308; Scott C. Janusko, 173 Shinnecock Dr., Manalapan, NJ (US) 07726

( * ) Notice: Subject to any disclaimer, the term of this patent is extended or adjusted under 35 U.S.C. 154(b) by 0 days.

(21) Appl. No.: 10/386,465

(22) Filed: Mar. 13, 2003

(51) Int. Cl.[7] .................................................. G02B 6/00
(52) U.S. Cl. ....................................................... 385/135
(58) Field of Search .............................. 385/134, 135, 385/136, 137, 139

(56) References Cited

U.S. PATENT DOCUMENTS

| | | | |
|---|---|---|---|
| 5,694,511 A | * 12/1997 | Pimpinella et al. | 385/134 |
| 5,778,130 A | 7/1998 | Walters et al. | |
| 5,825,962 A | 10/1998 | Walters et al. | |
| 6,009,223 A | 12/1999 | Arizpe | |
| 6,129,316 A | 10/2000 | Bauer | |
| 6,250,816 B1 | * 6/2001 | Johnston et al. | 385/53 |
| 6,256,443 B1 | 7/2001 | Uruno et al. | |
| 6,263,136 B1 | * 7/2001 | Jennings et al. | 385/48 |
| 6,381,393 B1 | 4/2002 | Matthews et al. | |
| 6,396,989 B1 | * 5/2002 | Johnston et al. | 385/134 |
| 6,424,781 B1 | 7/2002 | Puetz et al. | |
| 6,515,227 B1 | 2/2003 | Massey et al. | |
| 6,522,823 B1 | 2/2003 | Wentworth et al. | |
| 6,671,447 B1 | * 12/2003 | Gehrke | 385/135 |

FOREIGN PATENT DOCUMENTS

| | | |
|---|---|---|
| EP | 1 160 605 | 5/2001 |
| JP | 8056084 | 2/1996 |

* cited by examiner

*Primary Examiner*—Tulsidas Patel
*Assistant Examiner*—Thanh-Tam Le
(74) *Attorney, Agent, or Firm*—Richard C. Litman

(57) ABSTRACT

An optical fiber cable manager for use with a fiber distribution housing includes a rigid, horizontally disposed cable manager with a top and bottom surface. A plurality of cable retaining brackets are disposed on the bottom surface of the cable manager. A mounting slot is disposed on the top surface of the cable manager for mounting the cable manager to an optical fiber distribution housing. The cable manager is secured to the distribution housing using either a U-bolt or threaded screws. The optical fiber cable manager is fabricated within the optical fiber distribution housing for use with new distribution housings or as an attachment to an existing distribution housing. The optical fiber cable manager is fabricated from black powder-coated sheet metal.

14 Claims, 5 Drawing Sheets

OPTICAL FIBER CABLE MANAGER

BACKGROUND OF THE INVENTION

1. Field of the Invention

The present invention relates to optical fiber cable management systems, and more particularly to an internal optical fiber manager to be used within optical fiber distribution housings.

2. Description of the Related Art

In situations where a large number of optical fiber cables are to be connected, the connections are typically made in optical fiber distribution housings. The housings are typically comprised of a plurality of equipment racks that form bays for containing fiber optic equipment such as splice boxes and connection modules. Due to space limitations often found in many situations it is desirable that the fiber distribution housing allow for the connection of as many fiber cables as possible, in as small a space as possible. It is also important to keep all of the fiber cables organized and properly routed inside the fiber distribution housing.

Fiber optic cable managers have been designed to help organize cables that are routed through fiber distribution housings. Existing fiber cable managing systems are commonly external. External fiber cable managing systems often take up limited rack space that could be otherwise used for additional cable or equipment capacity in the rack. The following patent documents disclose examples of existing fiber management systems.

U.S. Pat. No. 5,778,130 to Walters et al. discloses an optical fiber connector housing. The housing includes a connector panel portion for holding a plurality of connectors. The connector panel is disposed on the front surface of the housing. A door is pivotally attached to the bottom portion of the housing and is spaced from and parallel to the connector panel. The housing further includes a plurality of brackets on a bottom surface of the housing for routing the fiber cable.

U.S. Pat. No. 5,825,962 to Walters et al. discloses an optical fiber splicing housing. The fiber housing includes a raceway unit disposed on the rear surface of the housing. A plurality of mounting brackets are disposed on the raceway unit. Each bracket has a slot for receiving fiber cable into the mounting bracket.

U.S. Pat. No. 6,009,223 to Arizpe discloses an external bracket assembly for strain relief of optical fiber jumpers. The bracket is mounted to a surface on the outside of a fiber distribution housing. The bracket is oriented longitudinally along the surface of the housing. Each bracket has a plurality of openings for receiving fanning finger blocks, which are used to route the cables.

U.S. Pat. No. 6,129,316 to Bauer discloses a telecommunications rack cable support bracket. The bracket includes two openings through which cable may be routed. A plurality of cable bundle management devices are mounted to each bracket. Support brackets are mounted along the top surface of a telecommunications rack.

U.S. Pat. No. 6,256,443 to Uruno et al. discloses an optical fiber distribution module for holding an optical fiber cord and fiber distribution system using optical fiber cords. The fiber distribution module comprises a plurality of fiber sorting clips. The sorting clips are U-shaped with right and left arm members. The arm members have fiber cord passageways for receiving and retaining fiber cords in a horizontal position.

U.S. Pat. No. 6,381,393 to Matthews et al. discloses a fanning strip for a cable management panel. The fanning strip is attached to a fiber optic distribution housing. The fanning strip has a one piece molded body with a base portion and a plurality of cable retainers extending from the base. The cable retainers hold cables in an organized manner. The fanning strip is located on either side of the distribution housing.

U.S. Pat. No. 6,424,781 to Puetz et al. discloses an optical fiber distribution frame with pivoting connector panels. The optical fiber distribution frame includes rotatable panels on either side of the frame. A rear cable guide is disposed within the frame. The frame includes a left and right vertical cable guide, each providing side access into the frame. The frame includes a lower cable splice area defining a plurality of splice tray holders. The frame includes a plurality of cable passageways and guides for directing the cable through the frame. Finally, the frame includes a plurality of adjustable cable rings located in a termination area of the frame.

U.S. Pat. No. 6,515,227 to Massey et al. discloses a fiber optic cable management enclosure with integral bend radius control. The enclosure includes mounting brackets for attaching the enclosure to an equipment rack. The sidewalls of the enclosure include openings for allowing the cable to pass through into the enclosure. A tray is positioned in the interior of the enclosure and includes a plurality of cable management clamps for restraining the cables within the enclosure.

U.S. Pat. No. 6,522,823 to Wentworth et al. discloses a low profile cable trough. The invention includes a lateral trough for defining a cable pathway. The lateral trough includes a planar upstanding side with a top end. An exit trough is mountable to the lateral trough to provide a cable exit pathway from the lateral trough. The exit trough includes an arch wall having an upper convex surface, a lower concave surface and a sidewall portion.

Japanese Pat. No. 8056084 to Hitoshi et al. discloses an optical cable aligning tool. The tool comprises a support cord and a ring for aligning the cable. The ring has an oblique slit for receiving optical cable. The ring is detachably mounted to the support.

European Pat. No. 1 160 605 to Caveney discloses an optical fiber routing and distribution system. The system includes an open frame with a plurality of enclosures for containing fiber optic equipment secured to the frame. The system includes a plurality of cable trough assemblies that define a horizontal cable pathway. The system further includes a plurality of cable rings mounted on either side of the open frame defining a vertical cable pathway.

It is desirable to have an optical fiber cable management system that allows for efficient management of the optical cables while minimizing the amount of space taken up by the cables and housing. Internal cable management systems provide a space saving option that is not afforded by external cable managers. Therefore, what is needed is a modular optical fiber cable manager that can be fabricated within the optical fiber distribution housing for new use or as an attachment to existing optical fiber distribution housings. What is further needed is a modular optical fiber cable manager that allows for the most efficient use of equipment rack and housing space while optimizing the cable management capabilities inside of the distribution housing. What is still further needed is a modular optical fiber cable manager that can be attached to an existing fiber distribution housing without having to make any modifications to the existing housing. Finally, what is still further needed is a modular optical fiber cable manager that is designed to properly manage the optical fiber cables in the top half of the fiber housing panels.

None of the above inventions and patents, taken either singly or in combination, is seen to describe the instant invention as claimed. Thus an optical fiber cable manager solving the aforementioned problems is desired.

SUMMARY OF THE INVENTION

The present invention is an optical fiber cable manager for use with a fiber distribution housing. A first embodiment of the present invention is an optical fiber cable manager attachment for attaching to an existing fiber distribution housing. The attachment comprises a rigid, horizontally disposed frame having a top surface and a bottom surface. A mounting slot adapted for fitting the optical fiber cable manager attachment to the interior of the fiber distribution housing is disposed on the top surface of the cable manager. The mounting slot extends from the front of the cable manager to the rear of the cable manager. The attachment further includes a plurality of cable retaining brackets that are disposed on the bottom surface of the cable manager.

The attachment also provides a securing device for releasably securing the attachment to the fiber distribution housing. In one embodiment the securing device is a U-bolt. In another embodiment the securing device is a plurality of threaded screws. The threaded screws are used when the existing fiber distribution housing contains screw receiving holes in the top surface of the housing.

A second embodiment of the present invention is an optical fiber distribution housing comprising a main container member fitted with a rigid, horizontally disposed top optical fiber cable manager. The main container member has a front surface, a rear surface, a top surface, a bottom surface, side surfaces and a door retaining projection disposed on the top surface. The door retaining projection extends outwardly from the front surface of the main container member.

A horizontally disposed bottom cable retaining portion extends outwardly from the bottom of the front surface. A pivoting front door is secured to the bottom cable retaining portion by a hinge member. The pivoting front door includes a locking slot, which is adapted to receive the door retaining projection. The front door pivots about the hinge member from a closed position to an open position. When the front door is in the closed position the locking slot engages the door retaining projection to secure the front door in the closed position.

A cable connector panel is disposed on the front surface of the main container member. A plurality of cable connector slots are disposed on the connector panel. The cable connector slots are adapted to receive optical fiber cables.

A plurality of cable retaining brackets are positioned on the top surface of the horizontally disposed bottom cable retaining portion. A second plurality of cable retaining brackets are positioned on the bottom surface of the horizontally disposed top cable retaining frame. The optical fiber cables enter into an open space defined between the pivoting front door and the main container member and engage the connector slots. The optical fiber cables are retained in an organized position by the two sets of cable retaining brackets.

The rigid horizontally disposed optical fiber cable manager is preferably fabricated from black powder-coated sheet metal. The sheet metal is bent into the desired shape to fit the particular optical fiber housing. Once the cable manager is formed, commercially available cable brackets are attached to the sheet metal. The cable retaining brackets include a cable receiving slot that permits the optical fiber cable to enter into the cable retaining brackets.

Accordingly, it is a principal object of the invention to provide a modular optical fiber cable manager that can be fabricated within the optical fiber distribution housing for new use or as an attachment to existing optical fiber distribution housings.

It is another object of the invention to provide a modular optical fiber cable manager that allows for the most efficient use of equipment rack and housing space while optimizing the cable management capabilities inside of the distribution housing.

It is a further object of the invention to provide a modular optical fiber cable manager that can be attached to an existing fiber distribution housing without having to make any modifications to the existing housing.

Still another object of the invention is to provide a modular optical fiber cable manager that is designed to properly manage the optical fiber cables in the top half of the fiber housing panels.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
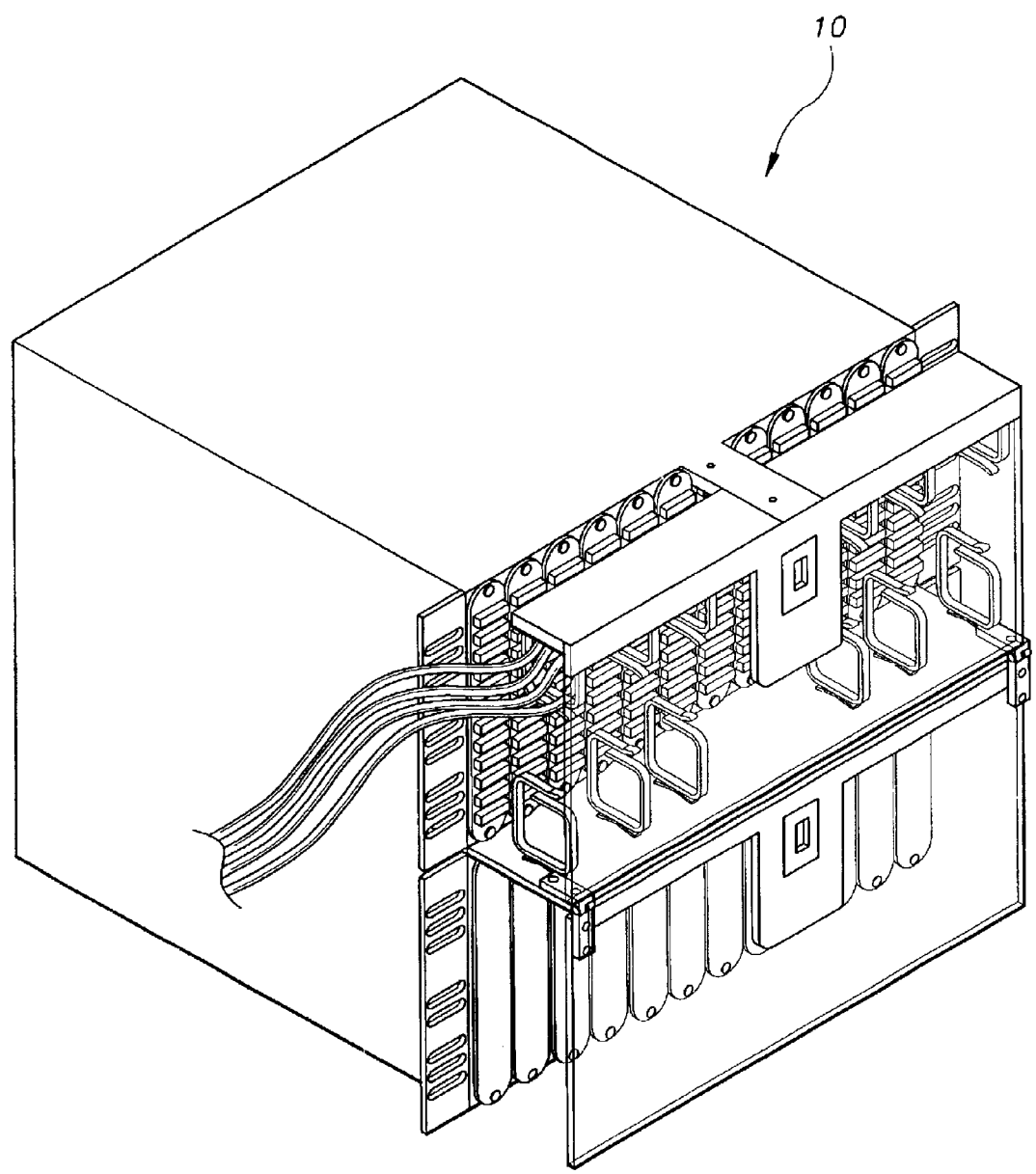
FIG. 1 is an environmental, perspective view of an optical fiber cable manager attached to a fiber distribution housing according to the present invention.

The present invention is an optical fiber cable manager for use with a fiber distribution housing. The optical fiber cable manager can be fabricated within a new optical fiber distribution housing or may be fabricated as an attachment for an existing optical fiber distribution housing. The optical fiber cable manager requires no additional rack space in order to provide its function because it is disposed on the interior of the optical fiber distribution housing. Additionally, the optical fiber cable manager may be attached to an existing distribution housing without having to modify the housing. FIG. 1 is an environmental perspective view of an optical fiber cable manager according to the present invention. The optical fiber cable manager is mounted to the interior of a fiber distribution housing 10.

Figure 2:
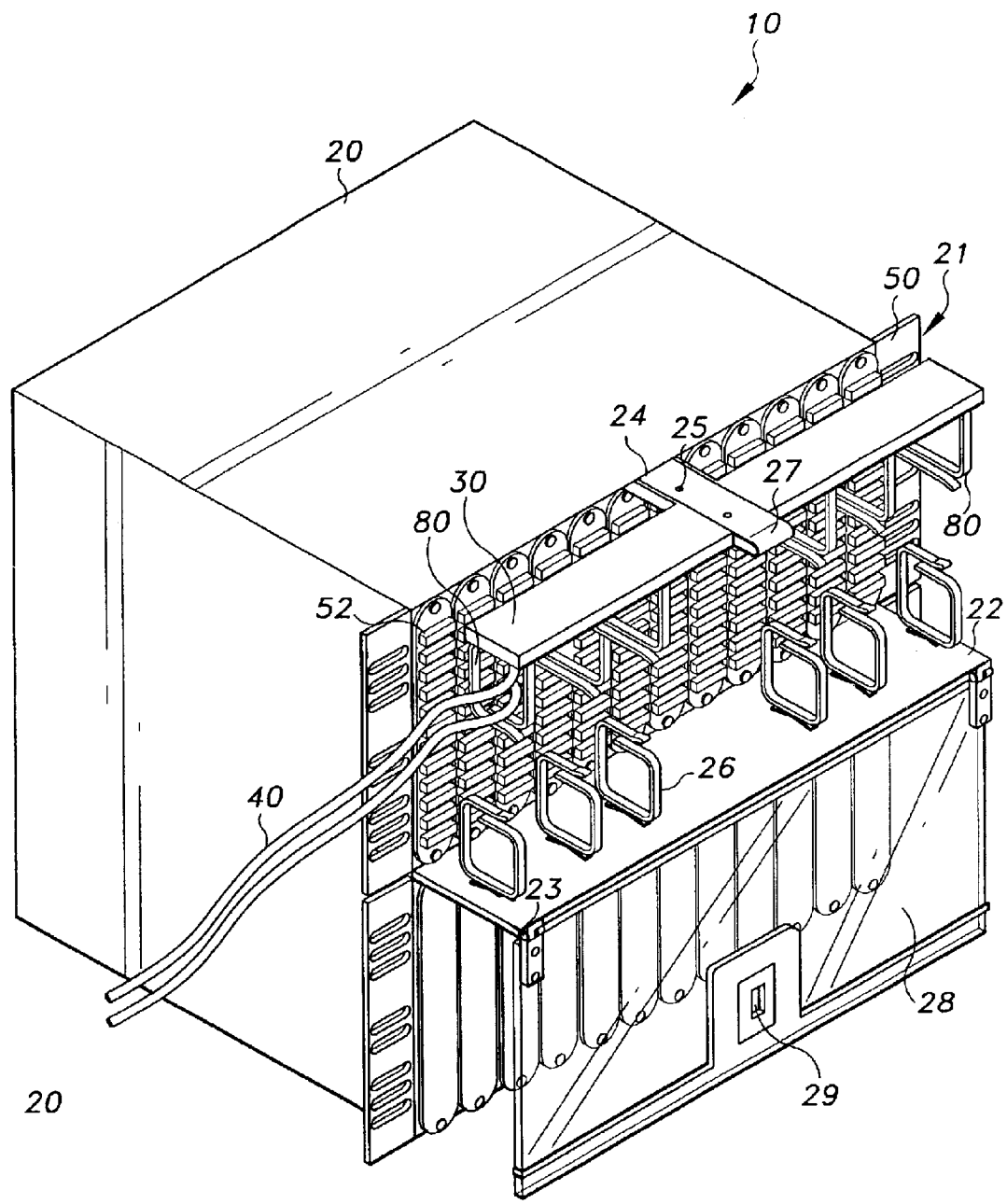
FIG. 2 is a perspective view of the optical fiber cable manager attached to an open fiber distribution housing.

FIG. 2 is a perspective view of the optical fiber cable manager 30 mounted to an optical fiber distribution housing 10. The optical fiber distribution housing 10 comprises a main container member 20, a connector panel 50, a pivoting front door 28 and a horizontally disposed bottom cable retaining portion 21. The main container member 20 further comprises a top surface, a bottom surface, a front surface 21, a rear surface, two side surfaces and a door retaining projection 24. The connector panel 50 is disposed on the front surface 21 of the main container member 20. The connector panel 50 further comprises a plurality of connector slots 52, which are adapted to receive optical fiber cables 40.

The door retaining projection 24 is disposed along the top surface of the main container member 20 and extends outwardly from the front surface 21 of the main container member 20. The door retaining projection 24 has a hooked end portion 27, which is adapted to releasably secure the pivoting front door 28 in a closed position.

The horizontally disposed bottom cable retaining portion 22 extends outwardly from the bottom of the front surface 21. A plurality of bottom cable retaining brackets 26 are disposed along the top surface of the bottom cable retaining portion 22. The bottom cable brackets 26 are adapted to retain optical fiber cables 40 that are engaged with the connector slots 52 disposed along the bottom half of the connector panel 50.

The pivoting front door 28 is pivotally secured to the bottom cable retaining portion 22 by a pair of hinges 23. The hinges 23 allow the front door to pivot from an open position (depicted in FIG. 2) to a closed position (depicted in FIG. 1). The front door 28 further comprises a locking slot 29. The locking slot 29 engages the hooked end 27 of the door retaining projection 24 to releasably secure the front door 28 in a closed position.

Figure 3:
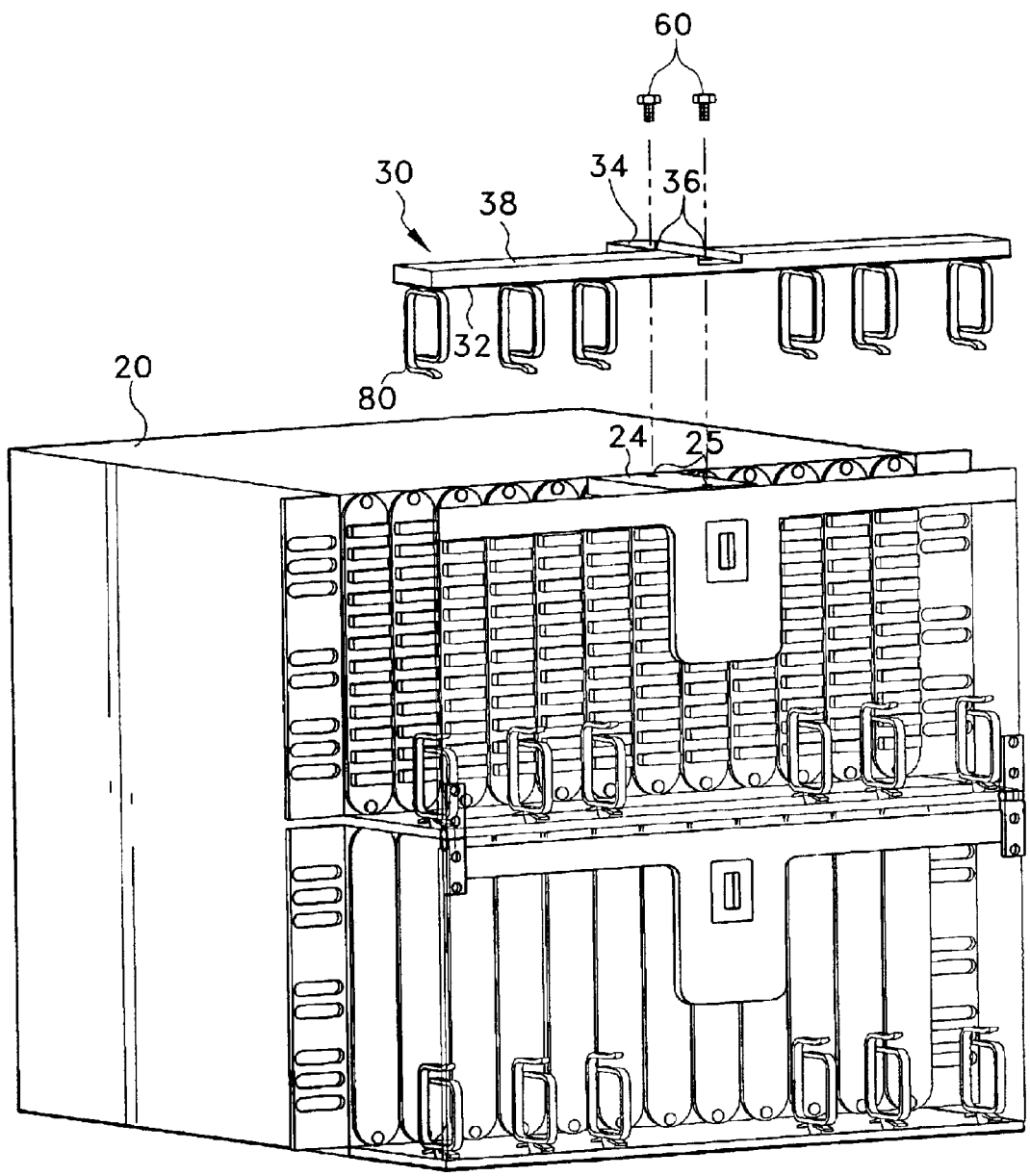
FIG. 3 is an exploded perspective view of a first embodiment of an optical fiber cable manager.

FIG. 3 depicts an exploded perspective view of an optical fiber cable manager 30 according to a first embodiment. The optical fiber manager 30 comprises a rigid, horizontally disposed, substantially planar frame. The optical fiber cable manager 30 further comprises a top surface 38 and a bottom surface 32. A mounting slot 34 is positioned on the top surface 38 of the optical fiber cable manager 30 and extends from the front of the optical fiber cable manager 30 to the rear of the optical fiber cable manager 30. The mounting slot 34 is adapted to fit the optical fiber cable manager to the door retaining projection 24 of the fiber distribution housing 10. The mounting slot 34 securely fits to the bottom surface of the door retaining projection 24. The top surface 38 of the optical fiber cable manager 30 rests flush with the top surface of the door retaining projection 24.

A plurality of top cable receiving brackets 80 are disposed on the bottom surface 32 of the optical fiber cable manager 30. The top cable receiving brackets 80 are adapted for retaining optical fiber cables (depicted in FIG. 2), which are engaged with the connector slots 52 on the top half of the connector panel 50. The top cable receiving brackets 80 are aligned evenly in a one-to-one ratio with the bottom cable brackets 26 so the number and spacing of the two sets of brackets is uniform.

The optical fiber cable manager 30 further comprises a securing device for securing the optical fiber cable manager 30 to the fiber distribution housing 10. In the present embodiment the securing device is a plurality of threaded screws 60. The securing device is not limited to the threaded screws depicted in FIG. 3 and may include any appropriate fastening device. A plurality of fastener receiving holes 36 are disposed in the mounting slot 34. The present securing device is used when the optical fiber cable manager 30 is mounted to certain fiber distribution housings that provide existing mounting holes 25 disposed on the door retaining projection 24. The threaded screws 60 extend through the mounting holes 25 and then through the fastener receiving holes 36 of the mounting slot 34, which is mounted to the bottom surface of the door retaining projection 24, to secure the optical fiber cable manager 30 to the door retaining projection 24 of the fiber distribution housing 10.

Figure 4:
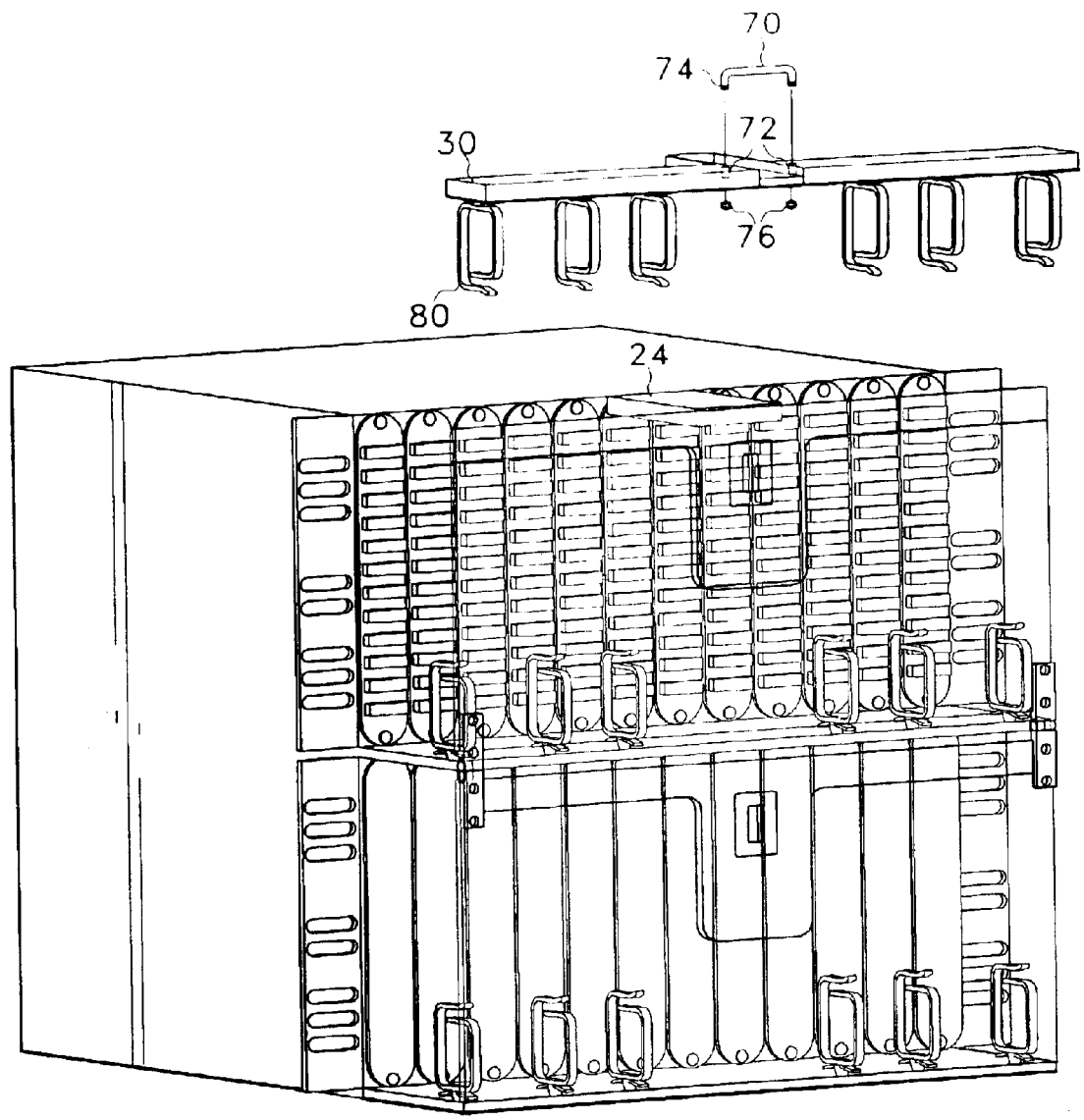
FIG. 4 is an exploded perspective view of a second embodiment of an optical fiber cable manager.

FIG. 4 is an exploded perspective view of a second embodiment of the optical fiber cable manager 30. The present embodiment generally comprises the features of the first embodiment depicted in FIG. 3. The present embodiment comprises an alternate securing device. The securing device in the present embodiment is a U-bolt 70. The U-bolt 70 is preferably used in situations where the fiber distribution housing 20 does not have existing mounting holes 25. The optical fiber cable manager 30 is fitted to the bottom surface of the door retaining projection 24 in the same manner as discussed in the previous embodiment.

The U-bolt 70 fits over the door retaining projection 24 to secure the optical fiber cable manager 30 in place. The U-bolt 70 has a flat top portion and two threaded ends 74. The threaded ends 74 engage bolt receiving holes 72 positioned on both sides of the mounting slot 34. A pair of securing nuts 76 secure the U-bolt 70 in place after extending through the bolt receiving holes 72.

Figure 5:
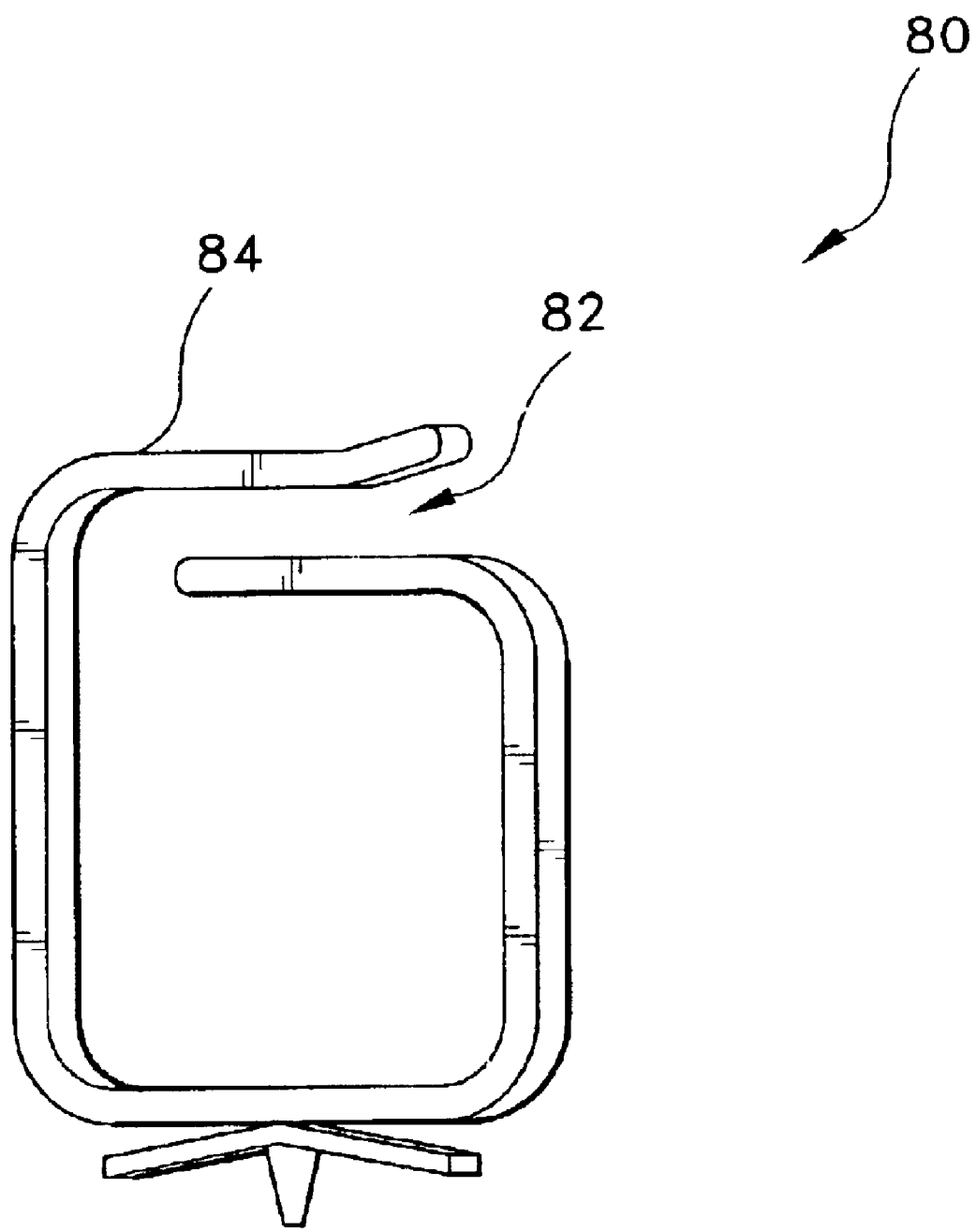
FIG. 5 is a perspective view of a cable retaining bracket.

FIG. 5 is a perspective view of a top cable retaining bracket 80. The top cable retaining brackets 80 are adapted to receive and retain optical fiber cables that are engaged with connector slots 52 in the top half of the connector panel 50. The cable retaining brackets have a generally square frame 84. The cable retaining brackets include a cable receiving slot 82 that permits the optical fiber cable to enter into the cable retaining brackets 80.

The rigid, horizontally disposed optical fiber cable manager 30 is preferably fabricated from black powder-coated sheet metal. The cable manager 30 is not limited to being made from black powder-coated sheet metal, and may be fabricated from any appropriate material. The sheet metal is bent into the desired shape to fit the particular optical fiber housing 10. Once the cable manager 30 is formed, commercially available cable brackets 80 are attached to the bottom surface of the sheet metal.

In use, optical fiber cables 40 enter into the open space defined between the pivoting front door 28 and the main container member 20. A first end of the optical fiber cables 40 engage the connector slots 52 in the connector panel 50. The optical fiber cables 40 are received by the cable receiving slots 82 and are then retained in an organized position by the top cable retaining brackets 80.

The optical fiber cable manager 30 allows users to maximize their typically limited equipment space. The internal mounting of the present optical fiber cable manager 30 provides an improved space saving feature that is not possible with existing external cable managers. The present optical fiber cable manager 30 also allows the user to more efficiently organize and route optical fiber cables connected to the fiber distribution housing 20. The design of the optical fiber cable manager 30 allows for installation without the need for modification to the existing fiber distribution housing 20. Finally, the optical fiber cables are offered a greater deal of protection because they are retained inside of the fiber distribution housing 20.

It is to be understood that the present invention is not limited to the embodiments described above, but encompasses any and all embodiments within the scope of the following claims.

We claim:

1. An optical fiber cable manager attachment for attaching to a fiber distribution housing comprising:
   a rigid, horizontally disposed frame further comprising a top surface and a bottom surface;
   a mounting slot adapted for fitting said optical fiber cable manager attachment to the interior of said fiber distribution housing, said mounting slot disposed on said top surface of said frame and extending from a front end of said top surface to a rear end of said top surface;
   a securing device for releasably securing said optical fiber cable manager attachment to said fiber distribution housing; and
   a plurality of cable retaining brackets disposed on said bottom surface of said frame;
   whereby said optical fiber cable attachment is releasably secured to said fiber distribution housing and said plurality of cable retaining brackets retain the optical fiber cables in an organized and space saving manner inside of said fiber distribution housing.

2. The optical fiber cable manager attachment according to claim 1, wherein said rigid, horizontally disposed frame is fabricated from black powder-coated sheet metal.

3. The optical fiber cable manager attachment according to claim 1, wherein said securing device is selected from the group consisting of U-bolts and threaded screws.

4. The optical fiber cable manager attachment according to claim 3, wherein said securing device is a U-bolt.

5. The optical fiber cable manager attachment according to claim 3, wherein said securing device is threaded screws.

6. The optical fiber cable manager attachment according to claim 5, wherein said horizontally disposed frame further comprises a plurality of screw receiving holes disposed in said mounting slot for receiving said threaded screws.

7. The optical fiber cable manager attachment according to claim 1, wherein said plurality of cable retaining brackets further comprise a cable receiving slot for allowing said optical fiber cables to enter into said cable retaining bracket.

8. An optical fiber distribution housing comprising:
   a main container member comprising a front surface, a rear surface, a top surface, a bottom surface, side surfaces and a door retaining projection disposed on said top surface and extending outwardly from said front surface;
   a horizontally disposed bottom cable retaining portion extending outwardly from the bottom of said front surface;
   a pivoting front door hingedly secured to said bottom cable retaining portion, further comprising a locking slot adapted to receive said door retaining projection;
   a plurality of bottom cable retaining brackets disposed along a top surface of said bottom cable retaining portion;
   a cable connector panel disposed on said front surface of said main container member, comprising a plurality of connector slots disposed on said cable connector panel, said connector slots adapted to receive optical fiber cables;
   a rigid, horizontally disposed top cable retaining frame secured to said door retaining projection comprising a top surface and a bottom surface, said top surface further comprising a retaining slot for fitting said retaining frame onto said door retaining projection;
   a securing device for releasably securing said optical fiber cable manager attachment to said fiber distribution housing; and
   a plurality of internal, top cable retaining brackets disposed on said bottom surface of said retaining frame;
   whereby said optical fiber cables enter into an open space defined between said pivoting front door and said main container member and engage said plurality of connector slots, said optical fiber cables are retained in an organized position by said top and bottom internal cable retaining brackets.

9. The optical fiber distribution housing according to claim 8, wherein said rigid, horizontally disposed top cable retaining frame is fabricated from black powder-coated sheet metal.

10. The optical fiber distribution housing according to claim 8, wherein said securing device is selected from the group consisting of U-bolts and threaded screws.

11. The optical fiber distribution housing according to claim 10, wherein said securing device is a U-bolt.

12. The optical fiber distribution housing according to claim 10, wherein said securing device is threaded screws.

13. The optical fiber distribution housing according to claim 11, wherein said rigid, horizontally disposed top cable retaining frame further comprises a plurality of screw receiving holes disposed in said retaining slot for receiving said threaded screws.

14. The otical fiber distribution housing according to claim 9, wherein said plurality of internal, top cable retaining brackets and said internal, bottom cable retaining brackets further comprise a cable receiving slot for allowing said optical fiber cables to enter into said cable retaining bracket.

* * * * *